(12) United States Patent
Marsh et al.

(10) Patent No.: US 11,904,755 B2
(45) Date of Patent: Feb. 20, 2024

(54) RATCHET STRAP HOOK LOCK DEVICE

(71) Applicants: Donald Marsh, Tunnel Hill, GA (US); Patricia Marsh, Tunnel Hill, GA (US)

(72) Inventors: Donald Marsh, Tunnel Hill, GA (US); Patricia Marsh, Tunnel Hill, GA (US)

( * ) Notice: Subject to any disclaimer, the term of this patent is extended or adjusted under 35 U.S.C. 154(b) by 0 days.

(21) Appl. No.: 18/155,359

(22) Filed: Jan. 17, 2023

(65) Prior Publication Data
US 2023/0234495 A1    Jul. 27, 2023

Related U.S. Application Data

(60) Provisional application No. 63/302,260, filed on Jan. 24, 2022.

(51) Int. Cl.
*F16B 45/04* (2006.01)
*B60P 7/08* (2006.01)

(52) U.S. Cl.
CPC .............. *B60P 7/083* (2013.01); *F16B 45/04* (2013.01)

(58) Field of Classification Search
CPC .... F16B 45/043; F16B 45/049; F16B 45/021; F16B 45/023; F16B 45/032; F16B 45/036; F16B 45/02; F16B 45/024; F16B 45/04; Y10T 24/45272; B60P 7/083
See application file for complete search history.

(56) References Cited

U.S. PATENT DOCUMENTS

| | | | | |
|---|---|---|---|---|
| 22,290 | A * | 12/1858 | Hotchkiss | F16B 45/036 24/600.9 |
| 805,646 | A * | 11/1905 | Hubbard | F16B 45/036 24/600.9 |
| 1,499,932 | A * | 7/1924 | Jacobson | B60C 27/06 24/600.9 |
| 1,739,848 | A * | 12/1929 | Loiselle | F16B 45/036 24/601.1 |
| 1,790,831 | A * | 2/1931 | Nilson | F16G 17/00 24/600.4 |
| 4,646,396 | A * | 3/1987 | Geese | F16B 45/02 248/302 |
| 5,832,571 | A * | 11/1998 | Kanamori | A44C 5/2038 24/599.6 |
| 2012/0192385 | A1 * | 8/2012 | Burdett | F16B 45/036 24/369 |
| 2015/0321639 | A1 * | 11/2015 | Horsefall | B60N 2/2887 24/600.9 |

* cited by examiner

*Primary Examiner* — Robert Sandy
*Assistant Examiner* — Michael S Lee
(74) *Attorney, Agent, or Firm* — Brennan, Manna & Diamond, LLC

(57) ABSTRACT

The present invention relates to a ratchet strap hook lock device for securing the hook of a ratchet strap to an anchor point. The body of the device can be attached to a ratchet strap by placing the strap within a notch in the body, placing at least one fastener through the body and fastening the fastener, and securing the lid to the body. Then, at least one hook of the lid can be placed on the base of a ratchet strap hook to further secure the device to the ratchet strap. When a user wishes to secure a hook of the ratchet strap to an anchor point, a lever of the device can be pushed through the body and locked into position such that an anchor point is positioned between the hook and the lever.

16 Claims, 6 Drawing Sheets

RATCHET STRAP HOOK LOCK DEVICE

CROSS-REFERENCE TO RELATED APPLICATION

The present application claims priority to, and the benefit of, U.S. Provisional Application No. 63/302,260, which was filed on Jan. 24, 2022, and is incorporated herein by reference in its entirety.

FIELD OF THE INVENTION

The present invention relates generally to the field of ratchet straps. More specifically, the present invention relates to a ratchet strap hook lock device that is primarily comprised of a body with at least one opening and at least one lever, and a lid comprised of at least one hook attached to the body via at least one hinge. The body can be attached to a ratchet strap by placing the strap within a notch in the body, placing at least one fastener through the body and fastening the fastener, and securing the lid to the body. Then, at least one hook of the lid can be placed on the base of a ratchet strap hook to further secure the device to the ratchet strap. When a user wishes to secure a hook of the ratchet strap to an anchor point, a lever of the device can be pushed through the body and locked into position such that an anchor point is positioned between the hook and the lever. Accordingly, the present disclosure makes specific reference thereto. Nonetheless, it is to be appreciated that aspects of the present invention are also equally applicable to other like applications, devices, and methods of manufacture.

BACKGROUND

Many individuals use ratchet straps to secure cargo loads. Ratchet straps are often comprised of a hook on each end. The hooks are secured to an area of a pickup truck, trailer, other vehicle, etc., to allow the ratchet strap to tighten down on the cargo. However, ratchet strap hooks may become unattached to said areas while a user is attempting to attach ratchet straps to a vehicle, especially when alone. This can be incredibly frustrating, as a user must then attempt to attach the straps each time a hook of the straps becomes unattached during the attachment process.

Therefore, there exists a long-felt need in the art for an improved ratchet strap. There also exists a long-felt need in the art for a ratchet strap hook lock device. More specifically, there exists a long-felt need in the art for a ratchet strap hook lock device that prevents a ratchet strap hook from becoming unattached. Further, there exists a long-felt need in the art for a ratchet strap hook lock device that prevents a ratchet strap hook from becoming unattached, wherein the device can be universally attached to any ratchet strap.

The subject matter disclosed and claimed herein, in one embodiment thereof, comprises a ratchet strap hook lock device. The device is primarily comprised of a body with at least one opening and at least one lever, and a lid comprised of at least one hook attached to the body via at least one hinge. The body can be attached to a ratchet strap by placing the strap within a notch in the body, placing at least one fastener through the body and fastening the fastener, and securing the lid to the body. Then, at least one hook of the lid can be placed on the base of a ratchet strap hook to further secure the device to the ratchet strap. When a user wishes to secure a hook of the ratchet strap to an anchor point, a lever of the device can be pushed through the body and locked into position such that the lever contacts the hook, and the anchor point is positioned between the hook and the lever.

In this manner, the ratchet strap hook lock device of the present invention accomplishes all the foregoing objectives and provides a ratchet strap hook lock device that prevents a ratchet strap hook from becoming unattached. Further, the device can be universally attached to any ratchet strap via the notch. As a result, the device can be universally applied to any ratchet strap to prevent the hook of the strap from becoming unattached to an anchor point during transport.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a ratchet strap hook lock device primarily comprised of a body with at least one opening and at least one lever, and a lid comprised of at least one hook attached to the body via at least one hinge. The body is generally square or rectangular in shape and preferably has two notches on the front and rear side walls of the body that allow a ratchet strap to be placed within the body.

The body is also comprised of at least two fastener openings that allow at least one fastener to be placed through the body. The openings are positioned near the top of the body on each side of the notch such that once a strap has been placed within the notch, the fastener can be placed over the top of the strap by being placed through both openings. The fastener can then be placed in a locked position outside the body to prevent the strap from being removed from the body. The fastener is preferably a zip-tie, but may be any fastener type known in the art.

The lid of the device is attached to the body via at least one hinge. Once a strap has been secured to the body using the fastener, the lid can be closed to further secure the strap within the notch. The lid may then be secured to the body via at least one lock such that the lid cannot come apart from the body. The lid is comprised of at least one opening, wherein at least one curved hook extends from the opening such that the hook engages the base of the ratchet strap hook to further secure the device to the ratchet strap hook.

The body is also comprised of at least one lever opening that allows at least one lever to move through the body. The first end allows a user to pull and push the lever through the opening. The second end of the lever may be curved in shape. When the device is in use, a user can push the first end into the opening from one side of the body, such that the second end fully extends from the opening and contacts the hook of the strap. In this manner, the hook is securely attached to an anchor point of a vehicle. The lever can also be locked at any length via at least one button that when depressed, presses against the lever within the opening.

The device is also comprised of a method of using the device. First, the lid is opened such that a ratchet strap can be placed flat within a notch of the body, wherein the device is positioned on the strap near the hook. Then, at least one fastener is fed through at least two fastener openings of the body over top of the strap and is secured in a fastened position outside of the body. The lid is then closed and secured to the body via at least one lock. Next, at least one hook of the lid is pulled from the lid and placed such that it contacts the base of the hook of the ratchet strap. Next, the hook of the ratchet strap can be placed around an anchor point of a vehicle, wherein the lever is then pushed from the first end such that the lever exits the opening and contacts the hook such that the anchor point is between the lever and the hook. A button of the device can then be depressed to lock the lever in a position such that the hook cannot become unattached around the anchor point.

Accordingly, the ratchet strap hook lock device of the present invention is particularly advantageous as it provides a ratchet strap hook lock device that prevents a ratchet strap hook from becoming unattached. Further, the device can be universally attached to any ratchet strap. In this manner, the ratchet strap hook lock device overcomes the limitations of existing ratchet straps known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
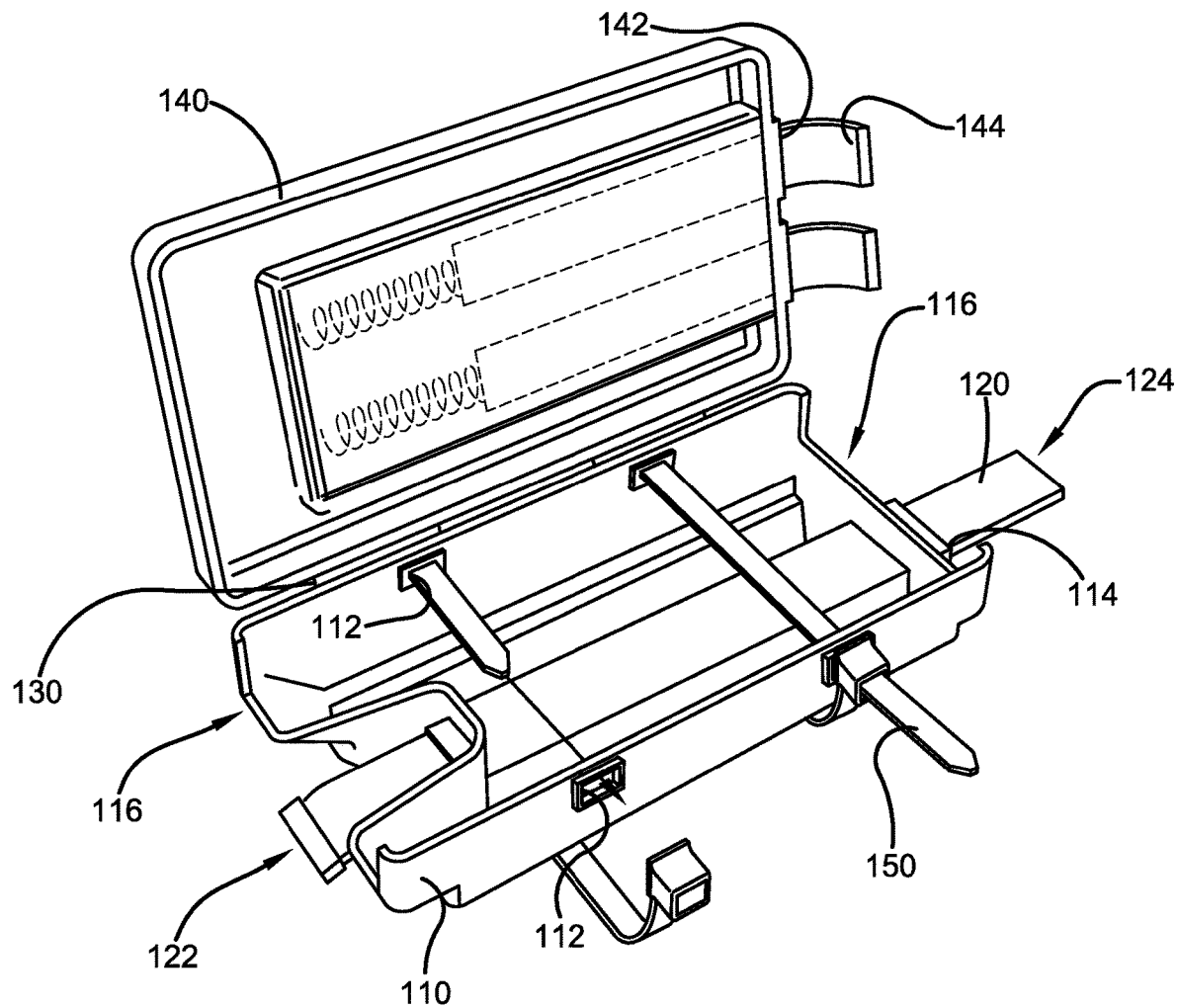
FIG. 1 illustrates a perspective view of one potential embodiment of a ratchet strap hook lock device of the present invention while open and unattached in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved ratchet strap. There also exists a long-felt need in the art for a ratchet strap hook lock device. More specifically, there exists a long-felt need in the art for a ratchet strap hook lock device that prevents a ratchet strap hook from becoming unattached. Further, there exists a long-felt need in the art for a ratchet strap hook lock device that prevents a ratchet strap hook from becoming unattached, wherein the device can be universally attached to any ratchet strap.

The present invention, in one exemplary embodiment, is comprised of a ratchet strap hook lock device primarily comprised of a body with at least one opening and at least one lever, and a lid comprised of at least one hook attached to the body via at least one hinge. The body is generally square or rectangular in shape and preferably has two notches on the front and rear side walls of the body. The notches allow a ratchet strap to be placed within the body.

The body is also comprised of at least two fastener openings that allow at least one fastener to be placed through the body. The openings are positioned near the top of the body on each side of the notch such that, once a strap has been placed within the notch, the fastener can be placed over the top of the strap by being placed through both openings. The fastener can then be placed in a locked position outside the body to prevent the strap from being removed from the body. The fastener is preferably a zip-tie, but may be any fastener type known in the art.

The lid of the device is attached to the body via at least one hinge. Once a strap has been secured to the body using the fastener, the lid can be closed to further secure the strap within the notch. The lid may then be secured to the body via at least one lock such that the lid cannot come apart from the body. The lid is comprised of at least one opening. At least one curved hook extends from the opening such that the hook engages the base of the ratchet strap hook to further secure the device to the ratchet strap hook.

The body is also comprised of at least one lever opening. The lever opening allows at least one lever to move through the body. The first end allows a user to pull and push the lever through the opening. The second end of the lever may be curved in shape. When the device is in use, a user can push the first end into the opening from one side of the body such that the second end fully extends from the opening and contacts the hook of the strap. In this manner, the hook is securely attached to an anchor point of a vehicle. The lever can also be locked at any length via at least one button that when depressed, presses against the lever within the opening.

The device is also comprised of a method of using the device. First, the lid is opened such that a ratchet strap can be placed flat within a notch of the body, wherein the device is positioned on the strap near the hook. Then, at least one fastener is fed through at least two fastener openings of the body over top of the strap and is secured in a fastened position outside of the body. The lid is then closed and secured to the body via at least one lock. Next, at least one hook of the lid is pulled from the lid and placed such that it contacts the base of the hook of the ratchet strap. Next, the hook of the ratchet strap can be placed around an anchor point of a vehicle, wherein the lever is then pushed from the first end such that the lever exits the opening and contacts the hook such that the anchor point is between the lever and the hook. A button of the device can then be depressed to lock the lever in a position such that the hook cannot become unattached around the anchor point.

Accordingly, the ratchet strap hook lock device of the present invention is particularly advantageous as it provides a ratchet strap hook lock device that prevents a ratchet strap hook from becoming unattached. Further, the device can be universally attached to any ratchet strap. In this manner, the ratchet strap hook lock device overcomes the limitations of existing ratchet straps known in the art.

Referring initially to the drawings, FIG. 1 illustrates a perspective view of one potential embodiment of a ratchet strap hook lock device 100 of the present invention while open and unattached in accordance with the disclosed architecture. The device 100 is primarily comprised of a body 110 with at least one opening 112 and at least one lever 120, and a lid 140 comprised of at least one hook 144 attached to the body 110 via at least one hinge 130. All/some components of the device 100 are preferably made from a durable metal such as, but not limited to, stainless steel or aluminum. All/some components of the device 100 may also be made from a rigid or flexible plastic such as, but not limited to, acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, etc.

The body 110 is generally square or rectangular in shape. The body 110 preferably has two notches 116 on the front and rear side walls of the body 110 that allow a ratchet strap 10 to be placed within the body 110. In different embodiments, the notch 116 and body 110 may be various sizes to accommodate a plurality of different ratchet strap 10 sizes.

Figure 2:
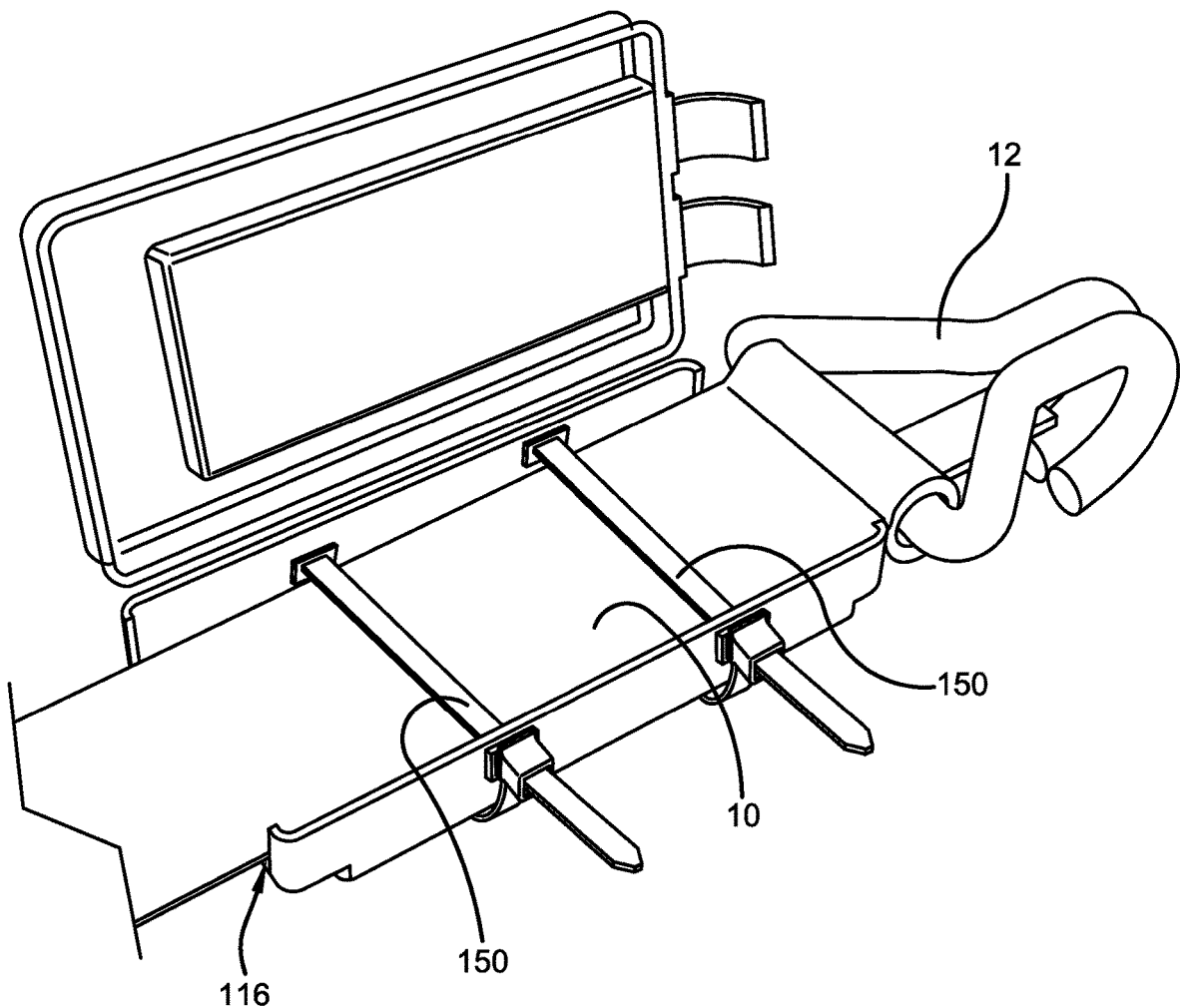
FIG. 2 illustrates a perspective view of one potential embodiment of a ratchet strap hook lock device of the present invention while open and partially attached to a ratchet strap in accordance with the disclosed architecture.
Figure 3:
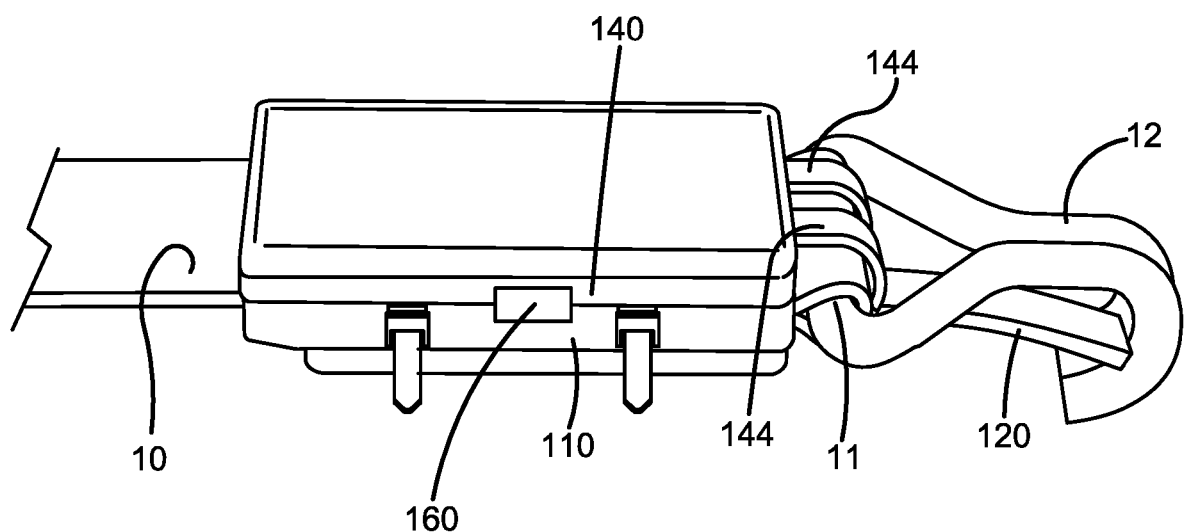
FIG. 3 illustrates a perspective view of one potential embodiment of a ratchet strap hook lock device of the present invention while open and fully attached to a ratchet strap in accordance with the disclosed architecture.
Figure 4:
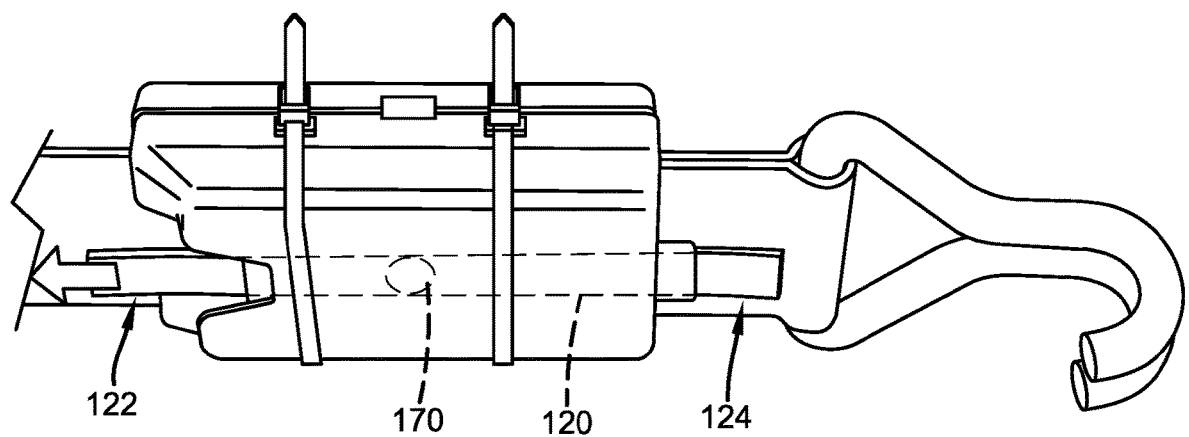
FIG. 4 illustrates a bottom perspective view of one potential embodiment of a ratchet strap hook lock device of the present invention while open and fully attached to a ratchet strap in accordance with the disclosed architecture.

The body 110 is also comprised of at least two fastener openings 112. The fastener openings 112 allow at least one fastener 150 to be placed through the body 110. The openings 112 are positioned near the top of the body 110 on each side of the notch 116 such that once a strap 10 has been placed within the notch 116, the fastener 150 can be placed over the top of the strap 10 by being placed through both openings 112, as seen in FIG. 2. The fastener 150 can then be placed in a locked position outside the body 110 to prevent the strap 10 from being removed from the body 110, as seen in FIG. 2, FIG. 3, and FIG. 4. This also keeps the device 100 in place on the strap 10. The fastener 150 is preferably a zip-tie, but may be any fastener type known in the art.

The lid 140 of the device 100 is attached to the body 110 via at least one hinge 130. Once a strap 10 has been secured to the body 110 using the fastener 150, the lid 140 can be closed to further secure the strap 10 within the notch 116. The lid 140 may then be secured to the body 110 via at least one lock 160 such that the lid 140 cannot come apart from the body 110. The lock 160 may be any type of lock known in the art, but is preferably a locking clasp, a keylock, a combination lock, etc.

The lid 140 is comprised of at least one opening 142. At least one curved hook 144 extends from the opening 142. In the preferred embodiment, the hook 144 is a spring-loaded hook 144 that attaches to the lid 140 via at least one spring 146. In this manner, the hook 144 retracts into the lid 140 when not in use. During use, the hook 144 engages the base 11 of the ratchet strap 10 hook 12 to further secure the device 100 to the ratchet strap 10 and specifically, the ratchet hook 12, as best seen in FIG. 3.

The body 110 is also comprised of at least one lever opening 114. The lever opening 114 allows at least one lever 120 to move through the body 110. The lever 120 is preferably captured within the body 110. The lever 120 is comprised of a first end 122 and a second end 124. The first end 122 allows a user to pull and push the lever 120 through the opening 114. The second end 124 of the lever 120 may be curved in shape.

Figure 5:
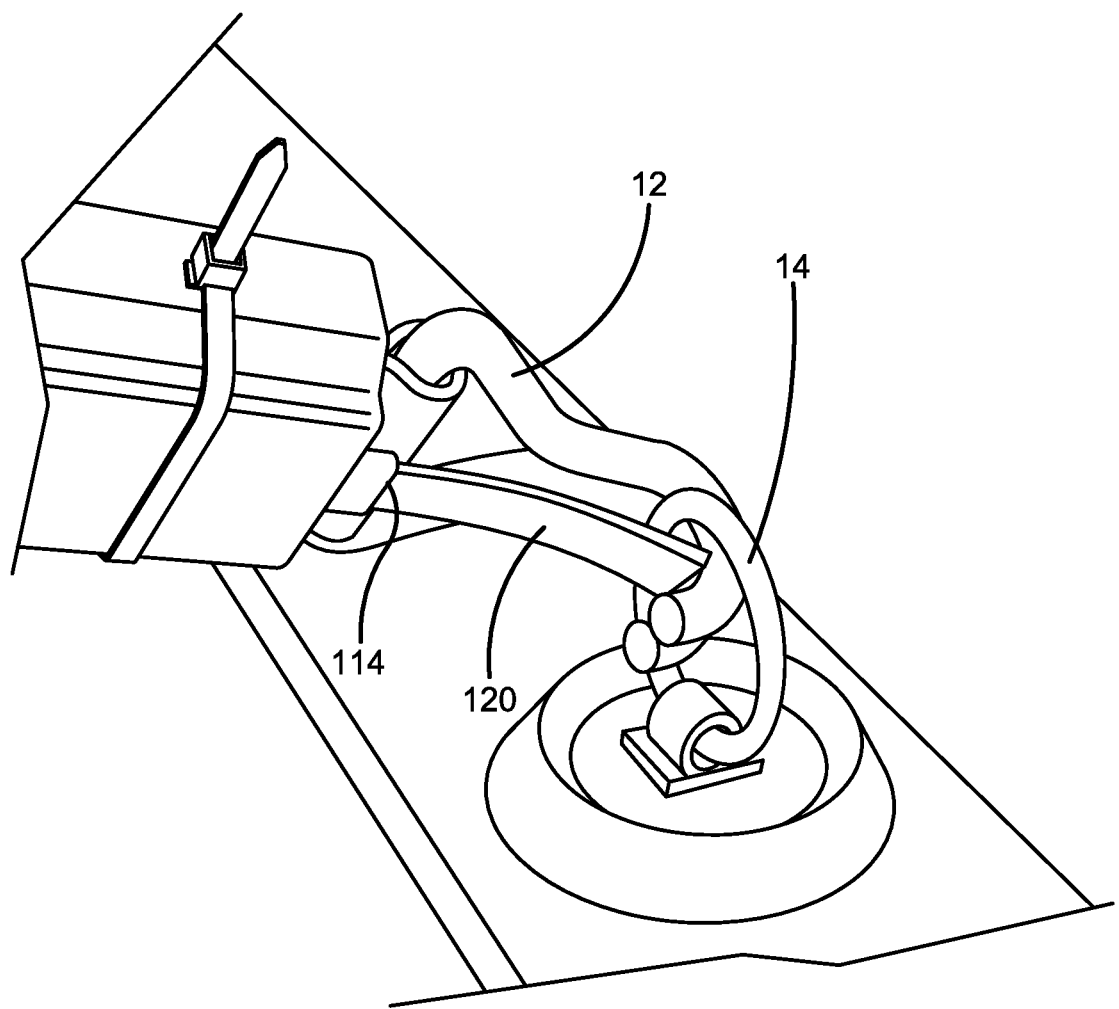
FIG. 5 illustrates an enhanced perspective view of one potential embodiment of a ratchet strap hook lock device of the present invention while open and fully attached to a ratchet strap (which is attached to an anchor point) in accordance with the disclosed architecture.

When the device 100 is in use, a user can push the first end 122 into the opening 114 from one side of the body 110 such that the second end 124 fully extends from the opening 114 and contacts the hook 12 of the strap 10, as seen in FIG. 5. In this manner, the hook 12 is securely attached to an anchor point 14 of a vehicle. The lever 120 is preferably flexible such that it can be easily pulled back through the opening 114.

The lever 120 can be locked at any length via at least one button 170. The button 170 is preferably a spring-loaded button that when depressed, presses against the lever 170 within the opening 114. As a result, the lever 120 is stopped at said position within the opening 114. When pressed again, the button 170 ceases to contact the lever 120 and the lever 120 can be repositioned as needed.

Figure 6:
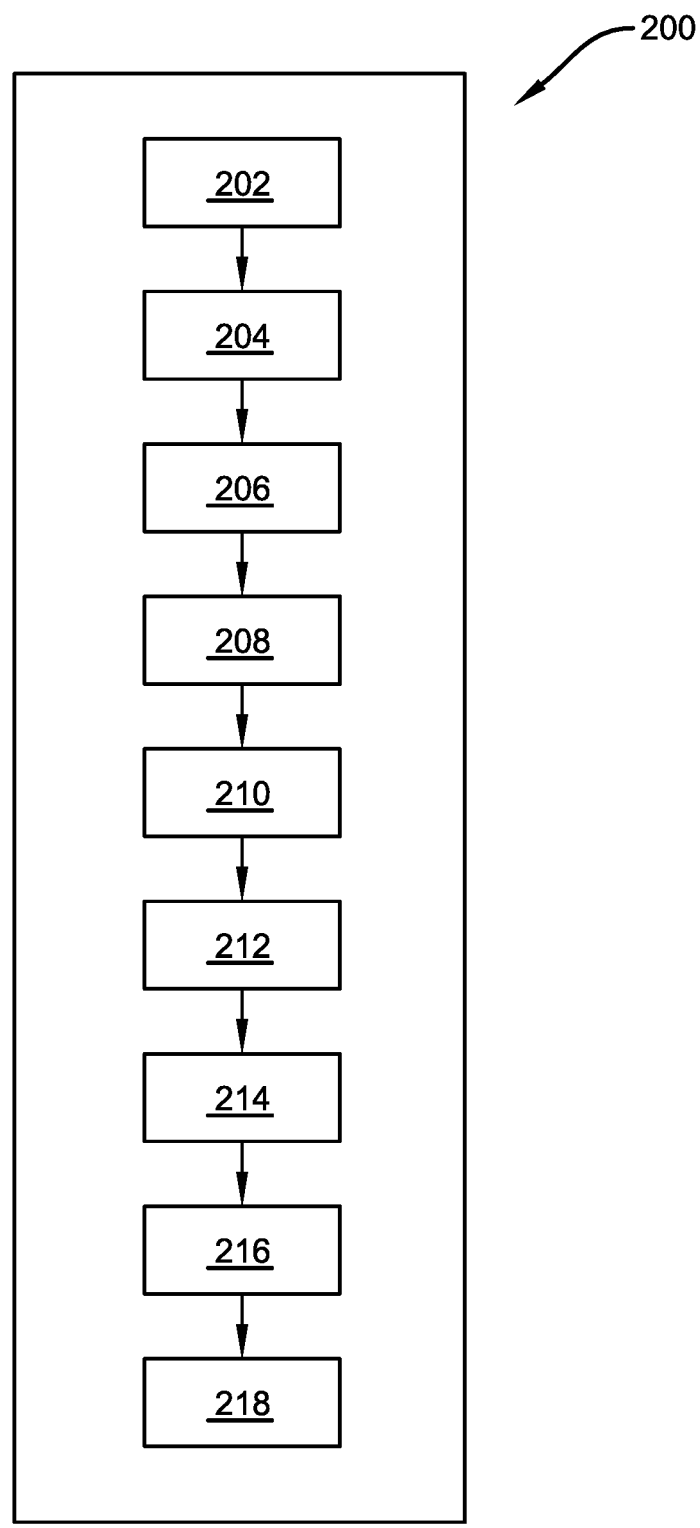
FIG. 6 illustrates a flowchart of a method of using one potential embodiment of a ratchet strap hook lock device of the present invention in accordance with the disclosed architecture.

FIG. 6 illustrates a flowchart of a method of using 200 one potential embodiment of a ratchet strap hook lock device 100 of the present invention in accordance with the disclosed architecture. The device 100 is also comprised of a method of using 200 the device 100. First, the lid 140 is opened such that a ratchet strap 10 can be placed flat within the notches 116 of the body 110, wherein the device 100 is positioned on the strap 10 near the hook 12 [Step 202]. Then, at least one fastener 150 is fed through at least two fastener openings 112 of the body 110 over top of the strap 10 [Step 204]. Next, the fastener 150 is secured in a fastened position outside of the body 110 [Step 206]. The lid 140 is then closed and secured to the body 110 via at least one lock 160 [Step 208]. Then, at least one hook 144 of the lid 140 is pulled from the lid 140 and placed such that it contacts the base 11 of the hook 12 of the ratchet strap 10 [Step 210]. Next, the hook 12 can be placed around an anchor point 14 of a vehicle [Step 212]. Then, the lever 120 is pushed from the first end 122 such that the lever 120 exits the opening 114 and contacts the hook 14 such that the anchor point 14 is between the lever 120 and the hook 12 [Step 214]. Next, the button 170 can be depressed to lock the lever 120 in position such that the hook 12 cannot become unattached around the anchor point 14 [Step 216]. When a user desires to unsecure the hook 12 from around the anchor point 14, the button 170 can be pressed to allow movement of the lever 120 and the lever 120 can be pulled back through the opening 114 such that the lever 120 no longer contacts the hook 12 (as seen in FIG. 4) and the hook 12 can be freely unattached from the anchor point 14 [Step 218].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "ratchet strap hook lock device" and "device" are interchangeable and refer to the ratchet strap hook lock device 100 of the present invention.

Notwithstanding the foregoing, the ratchet strap hook lock device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the ratchet strap hook lock device 100 as shown in the FIGS. are for illustrative purposes only, and that many other sizes and shapes of the ratchet strap hook lock device 100 are well within the scope of the present disclosure. Although the dimensions of the ratchet strap hook lock device 100 are important design parameters for user convenience, the ratchet strap hook lock device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A ratchet strap hook lock device comprising:
    a body comprised of a fastener opening and a lever opening;
    a lever;
    a fastener;
    a lid comprised of a lid opening;
    a hinge; and
    a hook.

2. The ratchet strap hook lock device of claim 1, wherein the hook is positioned within the lid.

3. The ratchet strap hook lock device of claim 2, wherein the hook exits the lid via the lid opening.

4. The ratchet strap hook lock device of claim 3, wherein the hook is comprised of a spring-loaded hook.

5. The ratchet strap hook lock device of claim 1, wherein the lever is captured within the lever opening.

6. The ratchet strap hook lock device of claim 1, wherein the lever is comprised of a flexible material.

7. A ratchet strap hook lock device comprising:
    a body comprised of a lever opening, a first fastener opening, and a second fastener opening;
    a lever positioned within the lever opening;
    a fastener;
    a lock;
    a lid comprised of a lid opening;
    a hinge; and
    a hook.

8. The ratchet strap hook lock device of claim 7, wherein the body is comprised of a first notch and a second notch.

9. The ratchet strap hook lock device of claim 7, wherein the fastener is comprised of a zip tie.

10. The ratchet strap hook lock device of claim 7, wherein the lock secures the lid to the body.

11. The ratchet strap hook lock device of claim 7, wherein the lid attaches to the body via the hinge.

12. The ratchet strap hook lock device of claim 7, wherein the lever is comprised of a curved lever.

13. The ratchet strap hook lock device of claim 7 further comprised of a button.

14. The ratchet strap hook lock device of claim 7, wherein pressing the button locks the position of the lever within the lever opening.

15. The ratchet strap hook lock device of claim 7, wherein the hook exits the lid via the lid opening.

16. The ratchet strap hook lock device of claim 7, wherein the first fastener opening aligns with the second fastener opening.

* * * * *